US011305814B2

(12) United States Patent
Liu (10) Patent No.: US 11,305,814 B2
(45) Date of Patent: Apr. 19, 2022

(54) AUTOMOBILE AND WHEEL STEERING SYSTEM

(71) Applicant: HANGZHOU TIANJUE STAGE ENGINEERING CO., LTD., Zhejiang (CN)

(72) Inventor: Zhenyong Liu, Zhejiang (CN)

(73) Assignee: ABOSI AUTOMOBILE HANGZHOU CO., LTD., Zhejiang (CN)

( * ) Notice: Subject to any disclaimer, the term of this patent is extended or adjusted under 35 U.S.C. 154(b) by 598 days.

(21) Appl. No.: 16/321,835

(22) PCT Filed: Aug. 3, 2017

(86) PCT No.: PCT/CN2017/095804
§ 371 (c)(1),
(2) Date: Jan. 30, 2019

(87) PCT Pub. No.: WO2018/028495
PCT Pub. Date: Feb. 15, 2018

(65) Prior Publication Data
US 2019/0168806 A1    Jun. 6, 2019

(30) Foreign Application Priority Data

Aug. 11, 2016  (CN) .......................... 201610658384.5
Aug. 11, 2016  (CN) .......................... 201620870402.1

(51) Int. Cl.
*B62D 6/00*    (2006.01)
*B62D 9/00*    (2006.01)
(Continued)

(52) U.S. Cl.
CPC ............ *B62D 6/001* (2013.01); *B60K 7/0007* (2013.01); *B62D 3/04* (2013.01); *B62D 5/001* (2013.01);
(Continued)

(58) Field of Classification Search
CPC .......... B62D 6/001; B62D 3/04; B62D 5/001; B62D 5/04; B62D 7/1509; B62D 7/026;
(Continued)

(56) References Cited

U.S. PATENT DOCUMENTS 3,280,931 A  * 10/1966  Cahill .................... B66C 23/62
                                                              180/23
7,648,004 B1    1/2010  Larouche et al.
(Continued)

FOREIGN PATENT DOCUMENTS

CN    102653246 A    9/2012
CN    103038124 A    4/2013
(Continued)

OTHER PUBLICATIONS

First Office Action dated Jan. 28, 2020 for Japanese patent application No. 2019-526357, English translation provided by Global Dossier.
(Continued)

*Primary Examiner* — Jacob D Knutson
*Assistant Examiner* — Harold Eric Pahlck, III
(74) *Attorney, Agent, or Firm* — Yue (Robert) Xu; Apex Attorneys at Law, LLP (57) ABSTRACT

A wheel steering system includes a steering device arranged on a steerable wheel, a signal execution device and a steering angle control device. The steering device includes a wheel support rotatably connected to a chassis by a slewing bearing, a bottom of the wheel support is rotatably connected to two ends of a rotary shaft of the steerable wheel, and the wheel support is configured to drive the steerable wheel to turn by 360 degrees through the slewing bearing. The signal execution device is configured to control an angle of rotation of the steerable wheel driven by the slewing bearing. The steering angle control device includes a plu-
(Continued)

rality of reciprocating switch rotors, and the plurality of switch rotors are configured to send electrical signals of steering angles to the signal execution device.

19 Claims, 6 Drawing Sheets

(51) Int. Cl.
| | |
|---|---|
| *B62D 15/02* | (2006.01) |
| *B62D 5/04* | (2006.01) |
| *B62D 7/02* | (2006.01) |
| *B62D 7/15* | (2006.01) |
| *B60K 7/00* | (2006.01) |
| *B62D 3/04* | (2006.01) |
| *B62D 5/00* | (2006.01) |

(52) U.S. Cl.
CPC .............. *B62D 5/04* (2013.01); *B62D 5/0421* (2013.01); *B62D 6/00* (2013.01); *B62D 7/026* (2013.01); *B62D 7/1509* (2013.01); *B62D 9/00* (2013.01); *B62D 15/021* (2013.01); *B62D 5/0475* (2013.01)

(58) Field of Classification Search
CPC .............. B62D 15/021; B62D 15/0215; B62D 15/022; B62D 15/02; B62D 6/00; B62K 7/0007; B62K 17/021
See application file for complete search history.

(56) References Cited

U.S. PATENT DOCUMENTS

| | | | | |
|---|---|---|---|---|
| 8,348,002 | B2 * | 1/2013 | Checketts | ............ B60K 7/0007 180/252 |
| 2002/0170764 | A1 * | 11/2002 | Oshima | .................. B62D 61/12 180/234 |
| 2003/0218374 | A1 | 11/2003 | Kress | |
| 2011/0024219 | A1 * | 2/2011 | Jorgensen | ................ B60G 3/01 180/252 |
| 2013/0056288 | A1 | 3/2013 | Gano et al. | |
| 2015/0028550 | A1 * | 1/2015 | Gano | .................. B60G 17/0163 280/5.51 |
| 2019/0248233 | A1 * | 8/2019 | Calleija | .................... B60B 19/00 |

FOREIGN PATENT DOCUMENTS

| | | |
|---|---|---|
| CN | 202987262 U | 6/2013 |
| CN | 103569197 A | 2/2014 |
| CN | 203698407 U | 7/2014 |
| CN | 204956616 U | 1/2016 |
| CN | 106043426 A | 10/2016 |
| CN | 205872174 U | 1/2017 |
| DE | 4303342 A1 | 8/1994 |
| EP | 0547570 A1 | 6/1993 |
| JP | S56131462 A | 10/1981 |
| JP | S6231576 U | 2/1987 |
| JP | H10274520 A | 10/1998 |
| JP | 2008222333 A | 9/2008 |
| JP | 2013530866 A | 8/2013 |
| WO | 2011/147648 A1 | 12/2011 |

OTHER PUBLICATIONS

Search Report dated Mar. 19, 2020 for European patent application No. 17838625.6.
International Search Report for PCT/CN2017/095804 dated Oct. 27, 2017, ISA/CN.
CNIPA First Office Action corresponding to Application No. 201610658384.5; dated Nov. 30, 2017.

* cited by examiner

AUTOMOBILE AND WHEEL STEERING SYSTEM

This application is the national phase of International Application No. PCT/CN2017/095804, titled "AUTOMOBILE AND WHEEL STEERING SYSTEM", filed on Aug. 3, 2017, which claims the priority to Chinese Patent Application No. 201610658384.5 titled "VEHICLE AND WHEEL STEERING SYSTEM", and Chinese Patent Application No. 201620870402.1 titled "VEHICLE AND WHEEL STEERING SYSTEM", filed with the China National Intellectual Property Administration on Aug. 11, 2016, the entire disclosures of which are incorporated herein by reference.

FIELD

The present application relates to the technical field of vehicle manufacture, and in particular to a vehicle and a wheel steering system.

BACKGROUND

The travel direction of a vehicle needs to be changed according to the driver's will when the vehicle is running. For a wheeled vehicle, the conventional method for steering the vehicle is realized by the driver operating a specific set of mechanical transmission mechanism or power steering mechanism to deflect a steerable wheel on a steering axle of the vehicle by a certain angle relative to the longitudinal axis of the vehicle, thereby changing the travel direction of the vehicle.

A conventional vehicle steering system includes a steering control mechanism, a steering gear, and a steering transmission mechanism. The steering control mechanism includes a steering wheel, a steering column, and a steering universal joint. The steering transmission mechanism includes a steering rocker arm, a steering tie rod, a steering knuckle arm and a steering trapezoidal mechanism. For a four-wheeled vehicle, when the conventional steering structure is used, it is required to drive the steering axle to turn two wheels at the same time. The conventional steering mechanism can only turn the wheels to the left and right by a particular angle, generally no more than 90 degrees to both left and right. Only two wheels in the same row are turned, so that the turning radius is very large, and it is often impossible to steer the vehicle in place at one time in a small space, and needs to adjust the vehicle for several times to allow the vehicle to turn in place. Besides, the conventional steering structure is too complicated, the manufacturing cost is high, and the later maintenance cost is high as well.

Therefore, for those skilled in the art, how to design a vehicle steering system with simple structure and flexible steering is a technical problem to be solved at present.

SUMMARY

A wheel steering system is provided according to the present application, which has a simple structure and flexible steering, and can achieve greater steering amplitude. The specific technical solution is as follows:

A wheel steering system includes:

a steering device arranged on a steerable wheel, wherein the steering device includes a wheel support rotatably connected to a chassis by a slewing bearing, a bottom of the wheel support is rotatably connected to two ends of a rotary shaft of the steerable wheel, and the wheel support is configured to drive the steerable wheel to turn by 360 degrees through the slewing bearing;

a signal execution device, configured to control an angle of rotation of the steerable wheel driven by the slewing bearing; and a steering angle control device including a plurality of reciprocating switch rotors, wherein the plurality of switch rotors are configured to send electrical signals of steering angles to the signal execution device.

Optionally, the steering angle control device further includes a steering wheel and a steering shaft; and the switch rotors are arranged at a bottom of the steering shaft in the shape of a circular arc, the steering shaft is provided with a contact piece, and, in a case that the steering wheel and the steering shaft rotate, the contact piece is configured to reciprocately flip the switch rotors.

Optionally, the signal execution device is a PLC programmer; an integrated hub motor is arranged on each of the steerable wheel; and a through hole is provided in a top of the wheel support and a center of the slewing bearing.

Optionally, the steering angle control device further includes a travel direction controller, and the PLC programmer is configured to control each steerable wheel to turn to a preset position according to a preset angle.

Optionally, the slewing bearing is provided with external teeth, and the slewing bearing is directly driven by a synchronous motor to rotate or is driven by an engagement between a worm driven by the synchronous motor and the external teeth of the slewing bearing to rotate.

Optionally, the number of the external teeth of the slewing bearing is 192, the number of teeth of a gear at an output end of the synchronous motor is 16, and the number of the switch rotors in the steering angle control device is 24.

Optionally, the steering angle control device further includes a locking swing arm, and one end of the locking swing arm is provided with locking teeth for engaging the slewing bearing; and the locking swing arm is controlled to swing by an electromagnet.

Optionally, the end of the locking swing arm that is provided with the locking teeth is pressed by a spring to engage the slewing bearing; and another end of the locking swing arm is attracted by the electromagnet to cause the locking swing arm to swing around a rotary shaft arranged at a center of the locking swing arm.

Optionally, a metal contact piece is arranged on each of the switch rotor, and the contact piece is configured to flip the switch rotor through the metal contact piece; and the electromagnet is energized when the contact piece is in contact with the metal contact piece.

Furthermore, a vehicle including the wheel steering system described by any of the above aspects is further provided according to the present application. Each of wheels is the steerable wheel, and each of the steerable wheels is provided with one set of the steering angle control device; and the slewing bearing is connected to the chassis by a hollow hydraulic shock absorber.

The wheel steering system is provided according to the present application, which includes the steering device arranged on the steerable wheel, the steering device includes the wheel support, the wheel support is rotatably connected to the chassis of the vehicle by the slewing bearing, and the bottom of the wheel support is rotatably connected to two ends of the rotary shaft of the steerable wheel to provide more stable support. The wheel support realizes steering by driving the wheels to rotate around the slewing bearing. Due to the slewing bearing structure, the wheels can rotate by 360 degrees. The slewing bearing is driven to rotate by a driving device. The wheel steering system further includes the signal execution device, the signal execution device is configured to control the slewing bearing, and the steering angle of the steerable wheel is further controlled by controlling the driving device of the slewing bearing. The wheel steering system further includes the steering angle control device, and the steering angle control device includes multiple reciprocating switch rotors regularly arranged. The reciprocating switch rotors send electronic signals of steering angles to the signal execution device, and the steering device is controlled by the signal execution device to realize steering.

The multiple switch rotors function as the steering angle control device in the wheel steering system provided by the present application, electronic signals are sent based on the opening and closing of the switch rotors, and then the electronic signals are transmitted to the signal execution device. After receiving the steering signal, the execution device outputs a corresponding rotation angle signal to the steering device. Then after receiving the signal sent from the execution device, the steering device rotates the slewing bearing, thereby driving the wheels to achieve steering. The slewing bearing can turn by 360 degrees, so that the vehicle can have steering amplitude of a greater angle, the steering is more flexible, and the wheel steering system has a simpler structure without a complicated mechanical transmission structure.

Besides, the vehicle provided by the present application can realize the same technical effects.

BRIEF DESCRIPTION OF THE DRAWINGS

For more clearly illustrating embodiments of the present application or the technical solution in the conventional technology, drawings referred to describe the embodiments or the conventional technology will be briefly described hereinafter. Apparently, the drawings in the following description are only several embodiments of the present application, and for the person skilled in the art other drawings may be obtained based on these drawings without any creative efforts.

FIG. 3 is a structural view of a reciprocating switch rotor with a left circuit being switched on;

FIG. 4 is a structural view of the reciprocating switch rotor with a right circuit being switched on;

REFERENCE NUMERALS slewing bearing 1;
locking swing arm 11;
electromagnet 12;
wheel support 2;
steering wheel 3;
steering shaft 31;
contact piece 32;
synchronous motor 4;
hollow hydraulic shock absorber 5;
worm 6;
wheel 7;
chassis 8;
switch rotor 9;
metal contact piece 91;
travel direction controller 10;
signal execution device 20.

DETAILED DESCRIPTION OF THE EMBODIMENTS

The core of the present application is to provide a wheel steering system with simple structure and flexible steering.

In order to enable those skilled in the art to better understand the technical solution of the present application, the vehicle and the wheel steering system of the present application are described in detail below with reference to drawings and specific embodiments.

Figure 1:
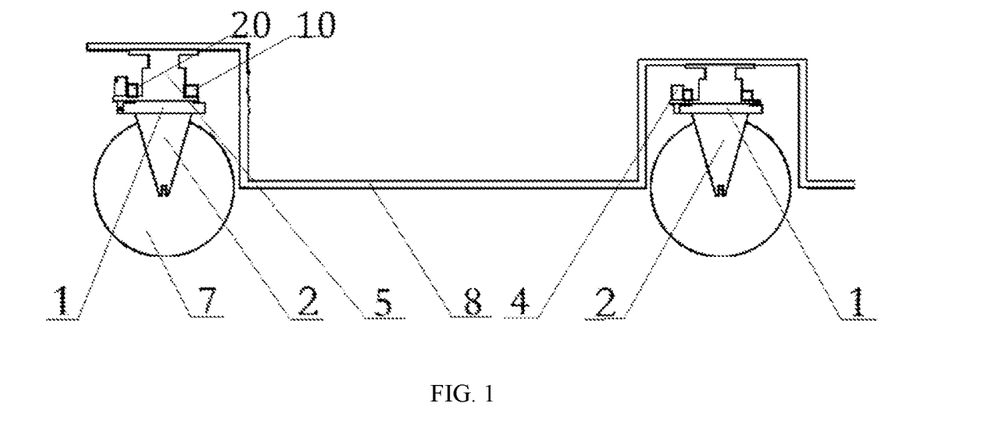
FIG. 1 is a front schematic view showing the structure of a wheel steering system provided by the present application.
Figure 2:
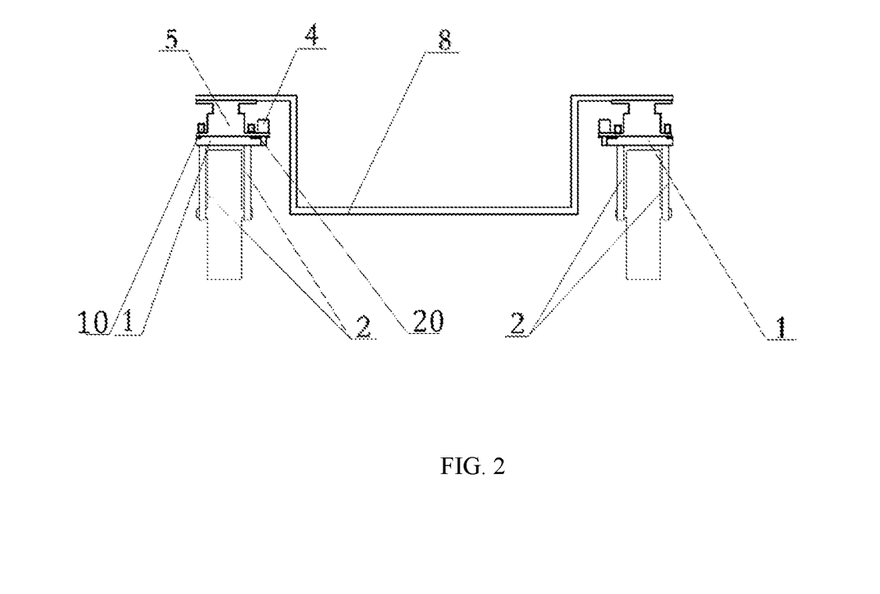
FIG. 2 is a side schematic view showing the structure of the wheel steering system provided by the present application.

Reference is made to FIGS. 1 and 2, which are a front schematic view and a side schematic view showing the structure of a wheel steering system provided by the present application. The wheel steering system provided by the present application includes components such as a steering device, a signal execution device 20 and a steering angle control device. The steering device is arranged on a wheel for controlling the rotation of the wheel to change the travel direction. The steering device further includes a slewing bearing 1 and a wheel support 2. The top of the wheel support 2 is rotatably connected to a chassis 8 of the vehicle through the slewing bearing 1, and the bottom of the wheel support 2 is rotatably coupled to two ends of a rotary shaft of the steerable wheel. The wheel is in contact with the ground, and the wheel support 2 supports the vehicle. It should be noted that, for other non-steerable wheel structures, support structures having the same function as the wheel support 2 are provided to support the vehicle together with the wheel support 2. Apparently, all the wheels may be configured as steerable wheels, each of which can achieve steering individually, and these specific embodiments all fall in the scope of protection of the present application.

The wheel support 2 can bring the steerable wheel to rotate by 360 degrees through the slewing bearing 1. The slewing bearing 1 includes an inner ring and an outer ring which are rotatable with respect to one another, one of the inner ring and the outer ring is fixed to the chassis 8 of the vehicle, and the other one is fixed to the wheel support 2. The wheel support 2 may rotate with respect to the chassis 8 through the slewing bearing 1. A plate surface of the slewing bearing 1 is approximately horizontally arranged, and can be correspondingly adjusted according to an inclination of the wheel support 2. The plate surface is kept approximately horizontal, and a deviation angle thereof is generally within 10 degrees. The inner ring and the outer ring of the slewing bearing 1 rotate approximately around a vertical rotary shaft. Correspondingly, an axis of the rotary shaft of the steerable wheel is approximately horizontally arranged, and the rotation of the wheel drives the vehicle to travel.

Figure 3:
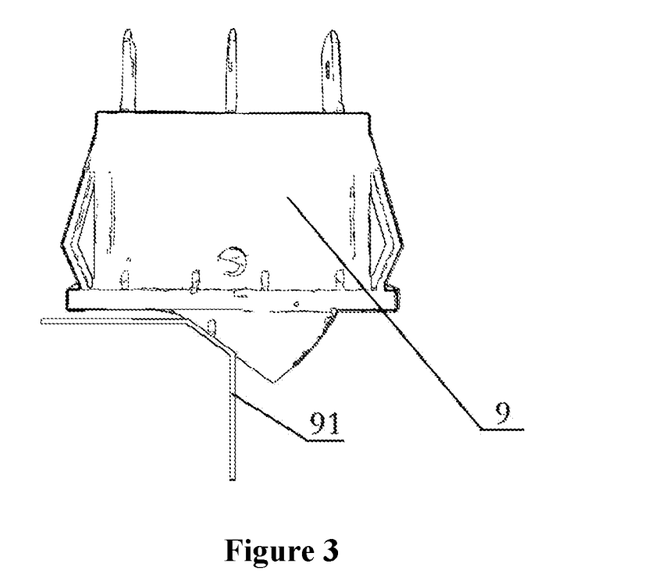
Figure 4:
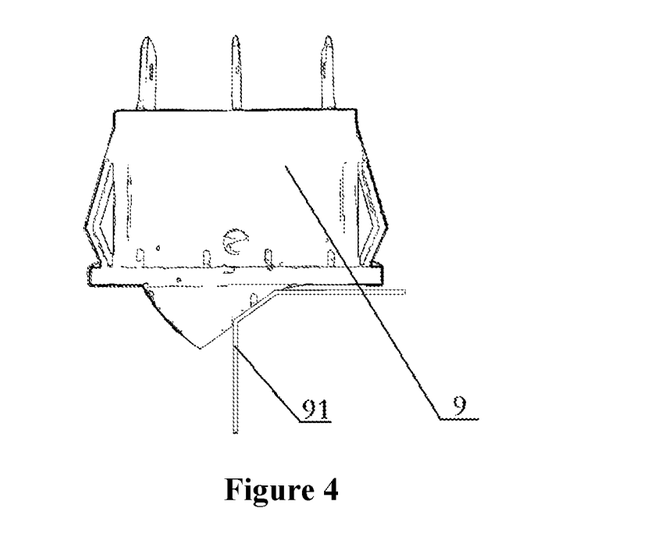

The steering angle control device includes multiple reciprocating switch rotors 9 regularly arranged, and the multiple switch rotors 9 send electronic signals of steering angles to the signal execution device 20. Each of the switch rotors 9 has two signal contact points, and is capable of outputting two signals for respectively controlling the rotation of the slewing bearing 1 in two different directions. Reference is made to FIG. 3 and FIG. 4, which are respectively the structural views showing the reciprocating switch rotor 9 in two different open and closed states, and FIG. 3 shows that the left circuit is switched on, and FIG. 4 shows that the right circuit is switched on. In practical arrangement, when the left circuit is switched on, the signal execution device 20 controls the steering device to turn to the left by a certain angle, and when the right circuit is switched on, the signal execution device 20 controls the steering device to turn to the right by a certain angle. Preferably, for ease of control, the signal outputted by each of the switching rotors 9 controls the steerable wheel to turn by the same angle. The multiple reciprocating switch rotors 9 are sequentially arranged, and the switch rotors 9 are flipped to the left one by one to switch on the left circuits sequentially, which drives the signal execution device 20 to sequentially control the wheel to turn left, and each time one switch rotor 9 is switched on, the wheel rotates by the same angle. Thus, the turning amplitude of the wheel can be controlled by controlling the number of the switched-on switch rotors 9, thereby achieving left steering. Correspondingly, reverse actions relative to the left steering can be performed when right steering is required, that is, the right circuits of the switch rotors 9 are switched on in sequence to control the turning amplitude of the right steering. It should be noted that, each time the left circuit or the right circuit of each of the switch rotors 9 is switched on, one steering signal is sent to the signal execution device 20 to achieve steering of a specific angle, and the steerable wheel does not turn in subsequent continuous contact state.

According to the wheel steering system provided by the present application, the multiple switch rotors 9 function as the steering angle control device. Electronic signals are sent by closed circuits of the switch rotors 9, the electronic signals are transmitted to the signal execution 20 device, and after receiving the steering signals, the execution device outputs corresponding signals to the steering device. After receiving the signals sent from the signal execution device 20, the steering device rotates the slewing bearing 1, to drive the wheel to turn. The slewing bearing 1 can turn by 360 degrees, so that the vehicle can have steering amplitude of a greater angle, the steering is more flexible, and the wheel steering system has a simpler structure without a complicated mechanical transmission structure. The wheel support 2 is turned by the slewing bearing 1, and the slewing bearing 1 is turned by the corresponding steering mechanism. Each steerable wheel is independently controlled, and no steering axle or the like is required. In the present application, the wheel support 2 is rotatably connected to two sides of the steerable wheel, a rotation center of the slewing bearing 1 is located above the wheel, and the slewing bearing is not interfered in any rotation direction. However, an avoiding space is required to be provided at the position where the steerable wheel is located, so that the steerable wheel will not be interfered when turning to a maximum angle of 90 degrees.

Furthermore, the steering angle control device of the present application further includes a steering wheel 3 and a steering shaft 31. The steering wheel 3 is fixed at one end of the steering shaft 31 for simulating a conventional steering control mode, and the driver turns the steering wheel 3 to control the steerable wheels to turn left and right. The switch rotors 9 are arranged at the bottom of the steering shaft 31 in the shape of a circular arc by taking a point on the rotary shaft of the steering shaft 31 as the center. The steering shaft 31 is provided with a contact piece 32. The contact piece 32 is perpendicular to an axial direction of the steering shaft 31. When the steering wheel 3 rotates synchronously with the steering shaft 31, the contact piece 32 flips the switch rotors 9 reciprocately, that is, switching on the left circuits of the switch rotors 9 sequentially, or switching on the right circuits of the switch rotors 9 sequentially, thereby simulating the conventional vehicle steering mode.

Furthermore, the signal execution device 20 is a PLC programmer, that is, a programmable logic controller. A program is preset in the PLC programmer, and after receiving the steering signals from the switch rotors 9, the signal execution device 20 controls the wheel support 2 to rotate. In addition to the PLC programmer, other forms of signal processing devices can be adopted, such as a PAC. One integral hub motor is arranged on each steerable wheel, and the steerable wheel is controlled to turn by the integral hub motor. Correspondingly, a corresponding battery assembly is further arranged in the vehicle body to supply power to the integrated hub motors. The integrated hub motor may also be controlled by the PLC programmer to rotate forward or backward to achieve steering. In addition, in order to facilitate wire arrangement of the integrated hub motor, the top of the wheel support 2 and the center of the slewing bearing 1 are both provided with through holes to allow wires to pass through. The wires are at the center position and do not interfere with the rotation angle of the slewing bearing 1 when the slewing bearing 1 is rotating.

Figure 5:
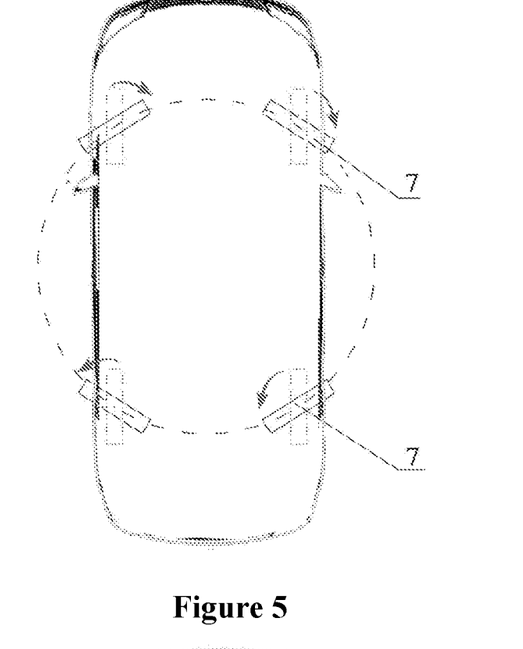
FIG. 5 is a schematic view showing wheels turning to an in-situ steering mode.
Figure 6:
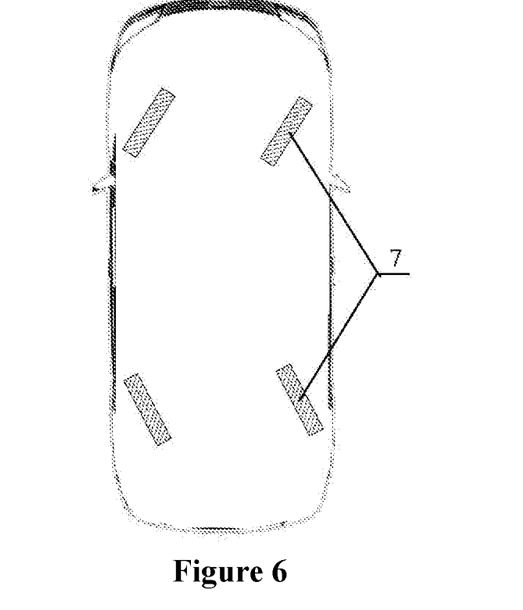
FIG. 6 is a schematic view showing the wheels rotating around a certain point outside the vehicle body.

In addition, the steering angle control device of the present application further includes a travel direction controller, and when activated, the travel direction controller 10 can control the PLC programmer to control the steerable wheels to turn respectively according to the preset angles in the PLC programmer. Reference is made to FIG. 5, which is a schematic view showing the wheels turning to an in-situ steering mode. In this figure, the upper left steerable wheel turns 58 degrees to the right, the upper right steerable wheel turns 122 degrees to the right, the lower left steerable wheel turns 58 degrees to the left, and the lower right steerable wheel turns 122 degrees to the left. A program containing steering angles of the four steerable wheels is written in the PLC programmer, the in-situ steering mode can be activated by an independent switch button, to allow the four steerable wheels to respectively turn to the required positions, and by starting the vehicle in the forward direction, the vehicle can be turned in situ. Apparently, in addition to this mode, other modes may be set as well, for example, a mode in which only the two front wheels are used as the steerable wheels, and the two back wheels travel in a straight line during the normal driving, or, another mode in which, as shown in FIG. 6, the wheels rotate around a point outside the vehicle body. The above situations are examples made based on a four-wheeled vehicle. The above modes may be applied to a vehicle having other numbers of wheels such as a three-wheeled vehicle, and the corresponding steering angles or the number of steerable wheels can be set in the program according to the specific situations.

Figure 7:
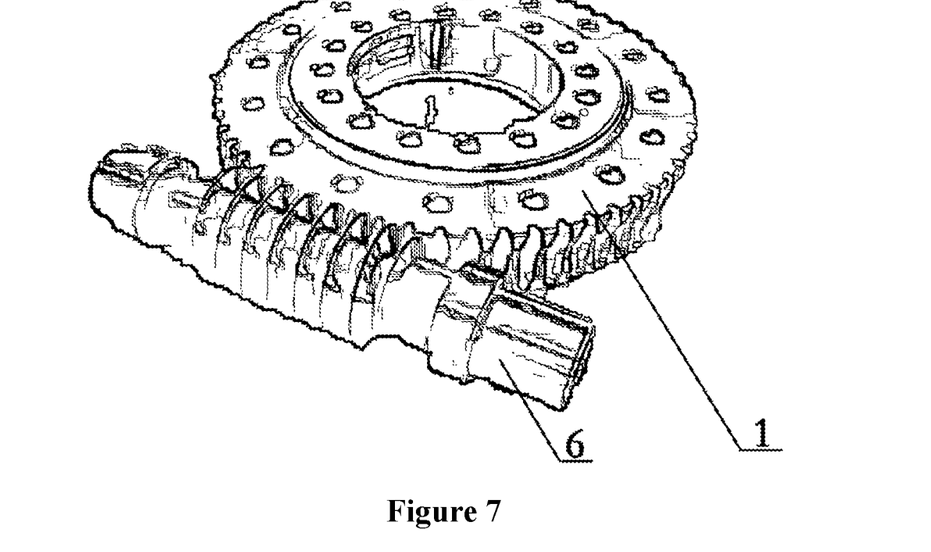
FIG. 7 is an axonometric structural view showing the cooperation between a worm and a steering bearing.

Specifically, the outer ring of the slewing bearing 1 is provided with external teeth, and the gear at the output end of the synchronous motor 4 directly drives the slewing bearing 1 to rotate, or the synchronous motor 4 drives the worm 6 to engage with the external teeth of the slewing bearing 1 to rotate the slewing bearing 1. Reference is made to FIG. 7, which is a perspective view showing the slewing bearing being driven by the worm 6, and the worm is driven by the motor. Alternatively, the slewing bearing 1 may be directly driven by the synchronous motor 4, and the synchronous motor 4 may be a direct current servo motor or a direct current stepping motor, which can ensure that multiple steerable wheels rotate synchronously. The PLC programmer outputs signals and the number of the signals is the same as the number of the steerable wheels.

Furthermore, the gear ratio of the gear at the output end of the synchronous motor to the slewing bearing 1 can be specifically set according to a steering accuracy. A specific setting is provided according to the present application. The number of the external teeth of the slewing bearing 1 is set as 192, and the number of teeth of the gear at the output end of the synchronous motor 4 is set as 16. The number of the switch rotors 9 in the steering angle control device is 24, twelve switch rotors 9 are provided at the left side and twelve switch rotors 9 are provided at the right side, including a total of forty-eight signal access points. The twenty-four switch rotors 9 are arranged to form a half circle, uniformly dividing 180 degrees. Apparently, the more the rotation units, the more sensitive the reaction, and if a higher accuracy requirement is required, more switch rotors 9 can be arranged.

The number of teeth of the slewing bearing 1 coupled to the wheel is designed as 192, and the number of teeth of the gear of the synchronous motor 4 for controlling the steering of the steerable wheel is designed as 16. The rotation angle of the twelve switch rotors 9 on each of the left side and the right side is 90 degrees, and 192 teeth (360 degrees in one rotation)/4 (90 degrees, a quarter of 360 degrees)=48 teeth. That is, a rotation angle of 90 degrees of the slewing bearing 1 controlling the steering of the wheel corresponds to 48 teeth, and 48 teeth/12 (the number of the switch rotors 9)=4 teeth, that is, each unit controls the slewing bearing 1 to rotate by 4 teeth. Then 360 degrees/192 (the number of teeth)×4=7.5 degrees, that is one unit of 4 teeth corresponds to the rotation angle of 7.5 degrees (4 teeth equivalent to 7.5 degrees), and the total number of teeth of the pinion is 16, then 16/4=4 and 360 degrees/4=90 degrees, thus each unit of the rotation of the output shaft pinion of the synchronous motor 4 is 90 degrees, that is, a quarter circle. The PLC programmer controlled by each switch rotor 9 sends out a corresponding signal, that the transmission angle is 90 degrees, to control the synchronous motor 4, that is, controlling the synchronous motor 4 to rotate one-quarter turn, driving the slewing bearing 1 to rotate by 7.5 degrees.

Figure 8:
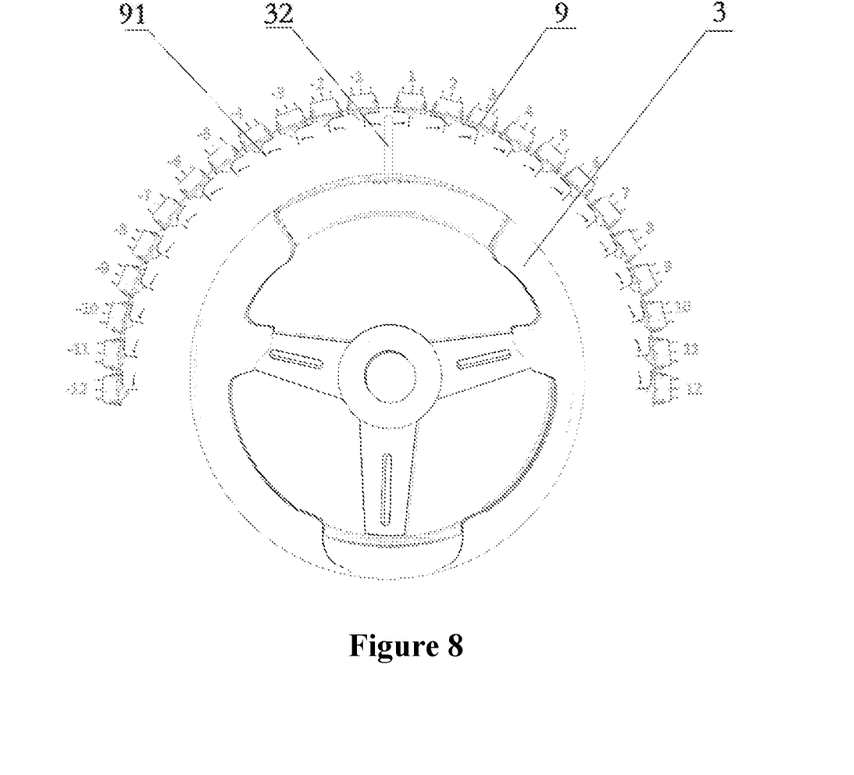
FIG. 8 is a schematic view showing a specific arrangement of switch rotors.

Reference is made to FIG. 8, which is a schematic view showing a specific arrangement of the switch rotors 9. Before being activated, the steering wheel 3 is located in the middle of the twenty-four switch rotors 9, and can be named as zero point. When the steering wheel 3 rotates to the left and the contact piece 32 comes into contact with the switch rotor 9 numbered as −1, the PLC programmer receives the signal sent by the switch rotor 9 No. −1, and then outputs corresponding pulse signals to four synchronous motors that control the steering of the wheels, and then the synchronous motors rotate by one unit counterclockwise (each unit represents a rotation angle of 7.5 degrees of the wheel). When the contact piece 32 comes into contact with the switch rotor 9 No. −2, the PLC programmer again outputs signals to the four synchronous motors that control the steering of the wheels, and the synchronous motors again rotate by one unit counterclockwise. When the contact piece 32 comes into contact with the switch rotor 9 No. −3, the PLC programmer again outputs signals to the four synchronous motors that control the steering of the wheels, and the synchronous motors again rotate by one unit counterclockwise. Similarly, when an internal pointer of the steering wheel is rotated to the switch rotor 9 No. −12, the steering wheel rotates by 90 degrees, while the wheels turn by twelve units, each unit is 7.5 degrees, and the rotation angle of the wheels is the same as that of the steering wheel, that is, 90 degrees in the same direction, and in this case, the travel direction of the vehicle is lateral. When the contact piece 32 reversely rotates, each time the contact piece 32 comes into contact with one switch rotor 9, the PLC programmer sends a signal to the synchronous motors that control the wheels, and the motors rotate by one unit. The above-mentioned one-to-one transmission ratio of the steering wheel 3 to the steerable wheel is only one specific form, and it is also possible to set the transmission ratio as other values, which all fall in the scope of protection of the present application.

Each of the switch rotors 9 is designed to have a contact angle of 90 degrees. When the contact piece 32 turns to the left, activating each of the rotors, the right sides of the activated switch rotors 9 tilt up, and the contact piece 32 restores each rotor when turning to the right. Each time one switch rotor 9 is restored, the PLC programmer receives a signal as well and sends a corresponding signal to the synchronous motors 4 that control the steering of the wheels, to allow the synchronous motors 4 to reversely rotate.

Figure 9:
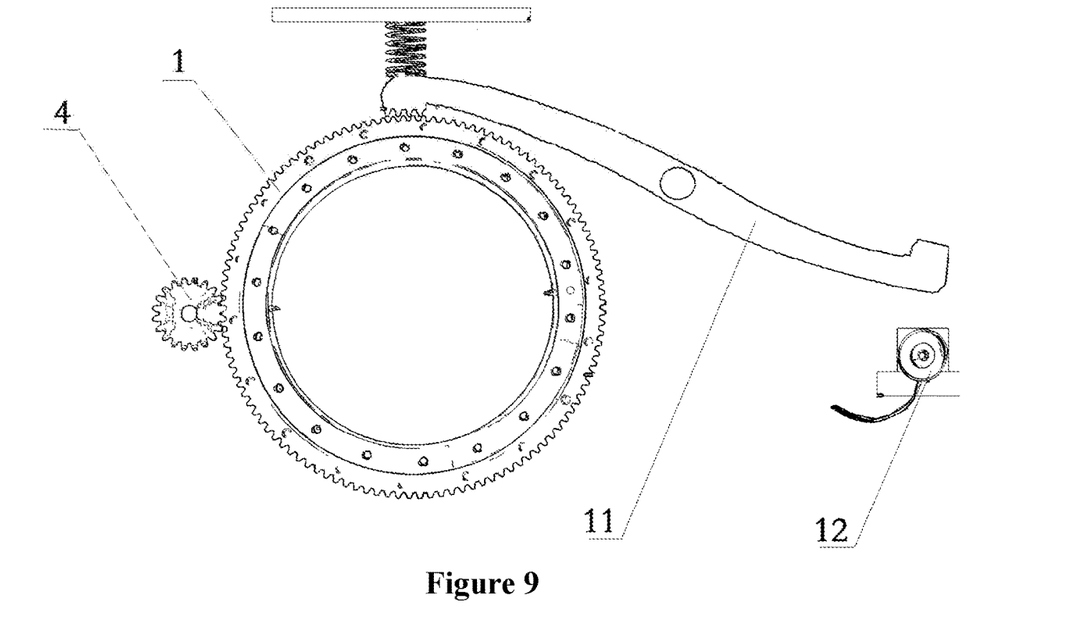
FIG. 9 is a structural view showing an engagement between a slewing bearing and a locking swing arm.

In addition, in order to ensure the stability of the slewing bearing 1, the steering angle control device further includes a locking swing arm 11, and one end of the locking swing arm 11 is provided with locking teeth for engaging the slewing bearing 1. Reference is made to FIG. 9, which is a structural view showing the engagement between the slewing bearing 1 and the locking swing arm 11, and the locking swing arm 11 is controlled by an electromagnet to swing.

Specifically, the end of the locking swing arm 11 that is provided with the locking teeth is pressed by a spring to engage with the slewing bearing 1, and another end of the locking swing arm 11 is attracted by an electromagnet 12 to cause the locking swing arm 11 to swing around the rotary shaft arranged at the center of the locking swing arm 11. The rear face of the end provided with the locking teeth is pushed by the spring, so that the locking teeth and the slewing bearing 1 are kept locked. The electromagnet is arranged at a certain distance from the other end of the locking swing arm. After the electromagnet is energized, the swing arm is attracted by the magnetic suction, and when one end of the swing arm moves downward, the other end moves upward. When the electromagnet is powered off, the swing arm is restored to the locked state by the pressure of the spring.

Figure 10:
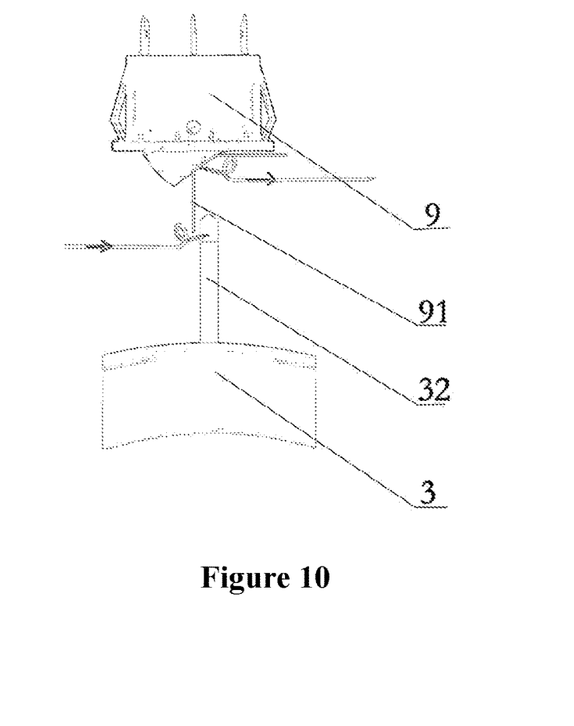
FIG. 10 is a structural view of a metal contact piece and wires arranged on the switch rotor.

Reference is made to FIG. 10, which is a structural view of a metal contact piece 91 and wires arranged on the switch rotor 9. The metal contact piece 91 is arranged on the switch rotor 9, and the contact piece 32 flips the switch rotor 9 through the metal contact piece 91. The contact piece 32 comes into contact with the metal contact piece 91, to energize the electromagnet 12. It is only required to disengage the lock swing arm 11 when the slewing bearing 1 needs to be rotated, so that a switch for controlling the unlocking of the slewing bearing 1 is in a really close relationship with a switch of the synchronous motor for controlling the rotation of the slewing bearing 1. While the rotation control is activated by the contact piece 32, so the best way is to design the two members into one piece. The metal contact piece 91 is arranged on the switch rotor 9 for controlling the signals of the PLC programmer, and the contact piece 32 is a metal conductor. By utilizing the characteristic of the contact piece 32 coming into contact with the metal contact piece 91 to activate the PLC programmer to output signals, switch lines of the electromagnet for controlling the steering lock are connected to the pointer and contact pieces of the switch rotor 9, thereby achieving the function of controlling the opening and closing.

Figure 11:
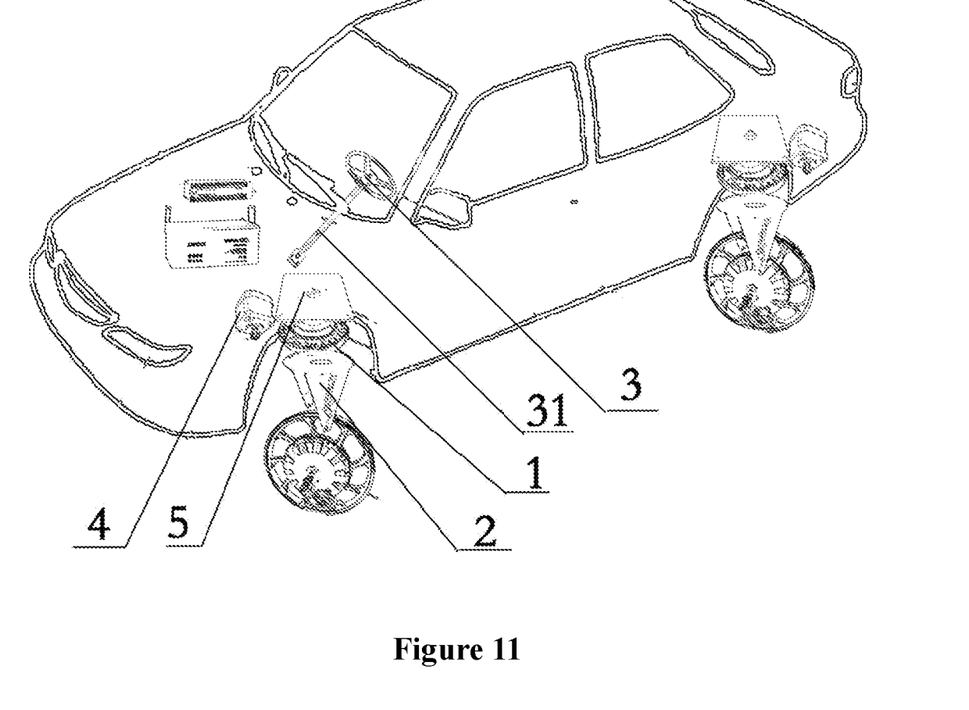
FIG. 11 is a schematic view showing the structure of a vehicle provided by the present application.

In addition, a vehicle is further provided according to the present application, which includes the wheel steering system described above, in which each wheel of the vehicle is a steerable wheel, and each of the steerable wheels is provided with one set of the steering angle control device. Reference is made to FIG. 11, which is a schematic view showing the structure of the vehicle provided by the present application. The vehicle of the present application is preferably an electric vehicle, which can be driven forward and backward by an integrated hub motor. The slewing bearing 1 is connected to the chassis 8 through a hollow hydraulic shock absorber 5, to reduce the vibration transmitted from the road surface.

The description of the embodiments herein enables the person skilled in the art to implement or use the present application. Various modifications to the embodiments are apparent to the person skilled in the art, and the general principle defined herein can be implemented in other embodiments without departing from the spirit or scope of the present application. Therefore, the present application is not limited to the embodiments described herein, but should be in accordance with the broadest scope consistent with the principle and novel features disclosed herein.

The invention claimed is:

1. A wheel steering system, comprising:
a steering device arranged on a steerable wheel, wherein the steering device comprises a wheel support rotatably connected to a chassis by a slewing bearing, a bottom of the wheel support is rotatably connected to two ends of a rotary shaft of the steerable wheel, and the wheel support is configured to drive the steerable wheel to turn by 360 degrees through the slewing bearing;
a signal execution device, configured to control an angle of rotation of the steerable wheel driven by the slewing bearing; and
a steering angle control device comprising a plurality of reciprocating switch rotors, wherein the plurality of switch rotors are configured to send electrical signals of steering angles to the signal execution device; wherein the steering angle control device further comprises a steering wheel and a steering shaft; and the switch rotors are arranged at a bottom of the steering shaft in the shape of a circular arc, the steering shaft is provided with a contact piece, and, in a case that the steering wheel and the steering shaft rotate, the contact piece is configured to reciprocately flip the switch rotors.

2. The wheel steering system according to claim 1, wherein the signal execution device is a PLC programmer; an integrated hub motor is arranged on each of the steerable wheel; and a through hole is provided in a top of the wheel support and a center of the slewing bearing.

3. The wheel steering system according to claim 2, wherein the steering angle control device further comprises a travel direction controller, and the PLC programmer is configured to control each of the steerable wheel to turn to a preset position according to a preset angle.

4. The wheel steering system according to claim 2, wherein the slewing bearing is provided with external teeth, and the slewing bearing is directly driven by a synchronous motor to rotate or is driven by an engagement between a worm driven by the synchronous motor and the external teeth of the slewing bearing to rotate.

5. The wheel steering system according to claim 4, wherein the number of the external teeth of the slewing bearing is 192, the number of teeth of a gear at an output end of the synchronous motor is 16, and the number of the switch rotors in the steering angle control device is 24.

6. The wheel steering system according to claim 4, wherein the steering angle control device further comprises a locking swing arm, and one end of the locking swing arm is provided with locking teeth for engaging the slewing bearing; and the locking swing arm is controlled to swing by an electromagnet.

7. The wheel steering system according to claim 6, wherein the end of the locking swing arm that is provided with the locking teeth is pressed by a spring to engage the slewing bearing; and another end of the locking swing arm is attracted by the electromagnet to cause the locking swing arm to swing around a rotary shaft arranged at a center of the locking swing arm.

8. The wheel steering system according to claim 6, wherein a metal contact piece is arranged on each of the switch rotors, and the contact piece is configured to flip the switch rotor through the metal contact piece; and the electromagnet is energized when the contact piece is in contact with the metal contact piece.

9. The wheel steering system according to claim 1, wherein the slewing bearing is provided with external teeth, and the slewing bearing is directly driven by a synchronous motor to rotate or is driven by an engagement between a worm driven by the synchronous motor and the external teeth of the slewing bearing to rotate.

10. The wheel steering system according to claim 9, wherein the number of the external teeth of the slewing bearing is 192, the number of teeth of a gear at an output end of the synchronous motor is 16, and the number of the switch rotors in the steering angle control device is 24.

11. The wheel steering system according to claim 9, wherein the steering angle control device further comprises a locking swing arm, and one end of the locking swing arm is provided with locking teeth for engaging the slewing bearing; and the locking swing arm is controlled to swing by an electromagnet.

12. The wheel steering system according to claim 11, wherein the end of the locking swing arm that is provided with the locking teeth is pressed by a spring to engage the slewing bearing; and another end of the locking swing arm is attracted by the electromagnet to cause the locking swing arm to swing around a rotary shaft arranged at a center of the locking swing arm.

13. The wheel steering system according to claim 11, wherein a metal contact piece is arranged on each of the switch rotors, and the contact piece is configured to flip the switch rotor through the metal contact piece; and the electromagnet is energized when the contact piece is in contact with the metal contact piece.

14. A vehicle, comprising the wheel steering system according to claim 1, wherein each of wheels is the steerable wheel, and each of the steerable wheels is provided with one set of the steering angle control device; and the slewing bearing is connected to the chassis by a hollow hydraulic shock absorber; wherein the steering angle control device further comprises a steering wheel and a steering shaft and the switch rotors are arranged at a bottom of the steering shaft in the shape of a circular arc, the steering shaft is provided with a contact piece, and, in a case that the steering wheel and the steering shaft rotate, the contact piece is configured to reciprocately flip the switch rotors.

15. The wheel steering system according to claim 1, wherein the slewing bearing is provided with external teeth, and the slewing bearing is directly driven by a synchronous motor to rotate or is driven by an engagement between a worm driven by the synchronous motor and the external teeth of the slewing bearing to rotate.

16. The wheel steering system according to claim 15, wherein the number of the external teeth of the slewing bearing is 192, the number of teeth of a gear at an output end of the synchronous motor is 16, and the number of the switch rotors in the steering angle control device is 24.

17. The wheel steering system according to claim 15, wherein the steering angle control device further comprises a locking swing arm, and one end of the locking swing arm is provided with locking teeth for engaging the slewing bearing; and the locking swing arm is controlled to swing by an electromagnet.

18. The wheel steering system according to claim 17, wherein the end of the locking swing arm that is provided with the locking teeth is pressed by a spring to engage the slewing bearing; and another end of the locking swing arm is attracted by the electromagnet to cause the locking swing arm to swing around a rotary shaft arranged at a center of the locking swing arm.

19. The wheel steering system according to claim 17, wherein a metal contact piece is arranged on each of the switch rotors, and the contact piece is configured to flip the switch rotor through the metal contact piece; and the electromagnet is energized when the contact piece is in contact with the metal contact piece.

* * * * *